United States Patent [19]
Stevens et al.

[11] 3,903,241
[45] *Sept. 2, 1975

[54] HYDROMETALLURGICAL RECOVERY OF NICKEL VALUES FROM LATERITES

[75] Inventors: Laurence G. Stevens; Leonhard A. Goeller; Marilyn Miller, all of Des Plaines, Ill.

[73] Assignee: Universal Oil Products Company, Des Plaines, Ill.

[ * ] Notice: The portion of the term of this patent subsequent to Nov. 13, 1990, has been disclaimed.

[22] Filed: Oct. 10, 1973

[21] Appl. No.: 404,950

[52] U.S. Cl. ................................................. 423/150
[51] Int. Cl.² ..................... C01G 53/00; C22B 3/00
[58] Field of Search ............... 423/150, 633; 75/119

[56] References Cited
UNITED STATES PATENTS 1,346,175   7/1920   Caron ................................. 423/150
2,954,278   9/1960   Gaskin et al. ..................... 423/150 X
3,772,424   11/1973  Stevens et al. ................... 423/150 X
3,773,891   11/1973  O'Neill ............................. 423/150 X
3,809,549   5/1974   Opratko ............................. 75/119 X Primary Examiner—Oscar R. Vertiz
Assistant Examiner—Brian E. Hearn
Attorney, Agent, or Firm—James R. Hoatson, Jr.; Raymond H. Nelson; William H. Page II

[57] ABSTRACT

The recovery of metal values from a metal bearing source such as ores is effected by treating the metal bearing source at an elevated temperature in the range of from about 750° to about 900° C. in a reducing atmosphere and in contact with at least one additive and thereafter extracting the metal bearing source in an acid solution whereby the desired metal is leached out of the metal bearing source and recovered.

10 Claims, No Drawings

HYDROMETALLURGICAL RECOVERY OF NICKEL VALUES FROM LATERITES

BACKGROUND OF THE INVENTION

In the processing of materials containing metal values, two of the main extractive methods to be considered are pyrometallurgy and hydrometallurgy. In the former, metal-containing material such as ore, slag, scrap, etc., is heated with appropriate agents such as reducing agents, fluxing agents, sulfidizing agents, chloridizing agents and/or oxidizing agents, etc., usually to the melting or fusion point of the mixture. At this temperature there is generally a separation of metallic values from gangue or waste materials. The procedure then calls for separating the metallic values from slag or waste material at a temperature at which both are molten. The phase containing the metal value is then cast to some convenient shape for use or for further refining, whichever is appropriate for the particular system involved. The very high temperatures involved in this technique are achieved via electric furnaces, blast furnaces, reverberatory furnaces, etc. Temperatures required for metals such as copper, nickel, iron would generally range from 2000° to 3000° F. An advantage in this method is that recoveries of the metal values are typically quite high.

The hydrometallurgy approach differs substantially from pyrometallurgy in that, although the metal bearing material such as ore, slag, scrap, etc., may be heated with agents such as reducing agents, oxidizing agents, sulfidizing and chloridizing agents as part of the procedure, the temperatures involved are generally much lower than with the usual pyrometallurgical method. These temperatures typically may be 500° to 1900° F., temperatures generally well below the fusion point of the metal-containing material.

Following this step, the treated metal-containing material then is contacted with an appropriate aqueous solution for extracting metal values by dissolution. The metal is then removed from the solution by precipitation, solvent extraction, evaporation of solvent, etc. The metal-containing residue obtained is then handled appropriately to further refine the metal. Although conditions of temperature are generally much lower than in pyrometallurgy, it is frequently found that recovery of the metal values is also lower than in the pyrometallurgical method.

A particular case where this is true concerns the extraction of nickel from lateritic nickel ores. The pyrometallurgical processes range from the use of an electric furnace for the direct smelting of ore to produce ferronickel through similar techniques involving the blast furnace in which an iron-nickel-sulfide matte is obtained. The extraction of nickel from the ore using this method is greater than 90%.

Of the several hydrometallurgy approaches used commercially for treating this type of ore, the practice on a highly serpentinic ore, such as at Nicaro, Cuba, involves roasting the ore in a multihearth furnace while a reducing gas, such as producer gas, passes countercurrent to the ore. Temperatures in this case range from about 900° to about 1350° F. Following the roasting step, the ore is cooled in the absence of air, mixed with an ammoniacal ammonium carbonate solution and vigorously agitated and aerated. This results in the dissolution of nickel and cobalt, separating them from the bulk of the ore. This solution then is treated with steam, driving off ammonia and precipitating nickel carbonate. This product then is treated further to obtain the appropriate form of nickel or used as such. In comparison to the pyrometallurgical process, however, extractions using this method have only been of the order of 70 to 80%.

Several other hydrometallurgy methods involve the use of procedures which include a roasting step with chlorides or sulfates but in other than reducing atmospheres, and the roasted ore is leached with an appropriate solvent such as dilute sulfuric acid. Alternatively, in certain cases the ore can be leached directly, such as with sulfuric acid solution but this is practical only when the magnesia content of the ore is low and when leaching conditions of high temperature, high pressure and high acid concentration are used. As will hereinafter be shown in greater detail, we have now discovered that an effective and economical process for recovering nickel using ambient leaching conditions and dilute acids may be effected by utilizing the process of the present invention.

This invention relates to a method for hydrometallurgical recovery of metal values from a metal bearing source. More specifically the invention is concerned with a method for the hydrometallurgical recovery of metal values such as nickel from a metal bearing source containing a mixture of many metals.

As will be hereinafter shown in greater detail, we have now discovered a method for treating metal bearing sources such as metal ores whereby the strength of the acid required may be effectively reduced by converting the desired metals such as nickel to a form available for dissolution.

It is therefore an object of this invention to provide an improved method for the hydrometallurgical recovery of metal values from a metal bearing source.

In one aspect an embodiment of this invention resides in a method for the hydrometallurgical recovery of metal values from a metal bearing source which comprises treating said metal bearing source at a temperature in the range of from about 550° to about 900° C. in a reducing atmosphere and in contact with at least one additive, cooling the metal bearing source, thereafter extracting said metal bearing source in an acidic solution, and recovering the desired metal value.

A specific embodiment of this invention is found in a method for the hydrometallurgical recovery of nickel from a metal bearing source which comprises treating said metal bearing source at a temperature in the range of from about 550° to about 900° C. in a reducing atmosphere and in contact with added gaseous sulfur and hydrogen chloride, cooling the treated metal bearing source and thereafter extracting said metal bearing source in an acid solution containing about 10% by weight of sulfuric acid, and thereafter recovering the desired nickel value therefrom.

Other objects and embodiments will be found in the following further detailed description of the present invention.

As hereinbefore set forth the present invention is concerned with a method for the hydrometallurgical recovery of metal values from a metal bearing source. The term "metal bearing source" as used in the present application and appended claims will refer to sources such as ore, slag, scrap, etc. In the interest of brevity, it is to be understood that reference to ore in the present specification will also include reference to the other metal bearing sources hereinbefore set forth. The improved process for the recovery of a desired metal value is particularly applicable to the recovery of nickel from such sources. However, it is to be understood that the process may also be used for the recovery of other metal values including, for example, copper, cobalt, manganese, etc.

The hydrometallurgical recovery of metal values may be effected utilizing conventional apparatus and in addition may utilize some conventional steps which have been set forth in prior art processes. Accordingly, the ore such as a lateritic nickel ore or other metal bearing source is first prepared in a manner suitable for the process, whereby the ore is subjected to treatment in order to form finely divided or comminuted particles, said grinding or other treatment being any which are well known in the art. The particles may be within a size range of from 35 to about 325 mesh and preferably within a range of from about 48 to about 200 mesh. The other ground particles are then dried in a conventional manner in order to lower the moisture content of said particles of from about the usual 25 to 50% down to about 8 to 10% or less. The drying step is generally effected by treating the particles in a rotary kiln at conventional temperatures.

Following the drying of the particles, said particles are then roasted at a temperature in the range of from about 550° up to about 900° C., said roasting being effected in a reducing atmosphere and in contact with at least one additive, the presence of said additive preventing the incorporation of nickel which will make it unavailable and which will at a later point enable the nickel to be recovered from the extraction step in a higher percentage. By roasting the ore in a reducing atmosphere in the presence of additives at this temperature, the magnesium compounds which are present will be prevented from converting to magnesium silicate in the form of forsterite, which formation usually acts to reduce the content of the nickel extractable forms. The reducing zone in which the ore is roasted may be of conventional nature and may include, for example, a multihearth furnace, a fluo-solids roaster, a Herreshoff furnace, etc. The reduction of the ore is effected by means of a suitable reducing gas mixture which, if so desired, may be of the general type which is used in conventional processes. Any suitable reducing gas mixture may be used and preferably comprises a mixture of hydrogen, carbon monoxide, carbon dioxide and water vapor. The gaseous mixture may come from any suitable source such as producer gas, gases formed by the combustion of city gas, gases formed by combustion of oil, etc. The specific gaseous mixture will be selected to effect the desired reduction of the nickel compounds to an extractable state. As an example, an illustrative gas mixture comprises a $CO:CO_2$ ratio within the range of from about 0.1:1 to 10:1, a $CO:H_2$ ratio of from about 0.1:1 to 10:1 and a $H_2:H_2O$ vapor ratio of from about 1.1:1 to 10:1, all being on a volumetric basis. In one embodiment, it is desirable to maintain the gas mixture within the ratios set forth above because an excessive concentration of one or more of the components in the gas mixture may have undesired effects such as, for example, incomplete reduction of the metal compound to the metallic state, excessive absorption of the gas in the ore particles, etc. It is to be understood that the gas mixture may contain other components as, for example, nitrogen, when advantages appear therefor. Other illustrative gas mixtures comprise hydrogen, nitrogen and water vapor or natural gas.

As hereinbefore set forth the roasting of the ore in the reducing atmosphere is also accomplished by contacting the ore with an additive. Examples of additives which may be used include hydrogen halide gas such as hydrogen chloride gas, hydrogen bromide gas, hydrogen iodide gas, or hydrogen fluoride gas, the latter two being used but not necessarily with equivalent results. The concentration of hydrogen halide gas which is used will be in a range of from about 0.001 to about 2%, and preferably from about 0.01 to about 1.5% by weight of the ore. In the event that hydrogen halide gas such as hydrogen chloride is used as the additive, it may be added in any suitable manner including direct addition to the hydrogen halide gas into the roasting zone, stripping of the hydrogen halide from a solution thereof, etc. In one preferable method, the reducing gas of the composition hereinbefore set forth is bubbled through an aqueous solution of the hydrogen halide and thus the hydrogen halide gas is carried into the reducing zone in this manner, preferably with preheating prior to charging said mixture into the reducing zone. The solution of hydrogen halide may range from 1% to saturated (37%) or even supersaturated, with a constant boiling solution containing 23% hydrogen chloride being of particular advantage in order to serve as a convenient control of the concentration of the hydrogen halide being added to the roasting zone. In another embodiment, the free halogen such as chlorine, bromine, etc. may be injected directly into the roasting zone wherein, upon contact with the reducing gas, it will be rapidly converted to the corresponding hydrogen halide.

Other methods of introducing precursors of hydrogen halide into the roasting zone and thereafter converting these precursors to hydrogen halide will include the use of precursors such as boron trichloride, boron tribromide, boron trifluoride, carbon tetrachloride, carbon tetrabromide, carbon tetrafluoride, phosphorus tribromide, phosphorus pentabromide, phosphorus trichloride, phosphorus pentachloride, phosphorus trifluoride, phosphorus pentafluoride, phosphorus triiodide, silicon tetrabromide, silicon tetrachloride, silicon tetrafluoride, silicon tetraiodide, methyl chloride, methylene chloride, methyl bromide, methylene bromide, methyl fluoride, methylene fluoride, methyl iodide, ethyl chloride, dichloroethylene, dibromoethylene, vinyl chloride, vinyl bromide, vinyl fluoride, vinyl iodide and higher molecular weight hydrocarbyl halides which generally will not contain more than about 20 carbon atoms per molecule. At the high temperatures encountered in the roasting step, the precursor will be decomposed to liberate the hydrogen halide or the halogen which is soon reduced to the hydrogen halide form. When desired, a mixture of the hydrogen halides and/or precursors may be employed.

Other additives which may be employed will include sulfur or sulfur compounds. The sulfur may be in gaseous form or may be in solid form including powder, flour, granules, pellets, etc. or molten or otherwise liquefied sulfur. Examples of sulfur-containing compounds will include pyrite ($FeS_2$) or the xanthates including methyl xanthate, ethyl xanthate, propyl xanthate, butyl xanthate, pentyl xanthate, hexyl xanthate, etc. or metal salts thereof such as sodium methyl xanthate, potassium methyl xanthate, calcium methyl xanthate, sodium ethyl xanthate, potassium ethyl xanthate, calcium ethyl xanthate, sodium propyl xanthate, potassium propyl xanthate, calcium propyl xanthate, sodium butyl xanthate, potassium butyl xanthate, calcium butyl xanthate, sodium pentyl xanthate, potassium pentyl xanthate, calcium pentyl xanthate, sodium hexyl xanthate, potassium hexyl xanthate, calcium hexyl xanthate, etc. When utilizing sulfur as the additive, the sulfur may be admixed with the air at an elevated temperature with the particles which are being withdrawn from the drying step. The sulfur is usually present in an amount ranging from a concentration of from about 0.1 to about 5% and preferably from about 0.15 to about 3% by weight of the ore. It is to be understood that any suitable means of introducing the sulfur into the reducing zone may be utilized. In addition, it is also contemplated within the scope of this invention that a combination of additives may be employed, such combinations including hydrogen halide, added sulfur in solid form and/or gaseous sulfur.

After roasting in the reducing atmosphere and in contact with at least one additive of those hereinbefore set forth, the particles are withdrawn from the reducing zone, cooled, and subjected to extraction by being slurried with solutions which are acidic in nature and which will contain from about 1 to about 10% acid content. Examples of acids which may be utilized will include inorganic acids such as hydrochloric acid, hydrobromic acid, nitric acid, phosphoric acid, sulfuric acid, etc., the preferred acids being hydrochloric acid or sulfuric acid due to greater availability thereof. In one embodiment the transfer of the reduced ore particles from the reducing zone to the cooling zone and the extraction or leaching solution is accomplished under a nitrogen blanket in order to avoid the possibility of oxidation of the metals to the oxide or to other oxygen-containing compounds. The metal bearing source or ore particles are then leached for a period of from about 30 minutes to about 2.5 hours or more, following which the solution of the desired metals such as nickel is withdrawn from the leaching or extraction zone and thereafter treating in any suitable manner to precipitate the nickel and to recover the same.

In order to overcome an objection to low temperature acid leaching of raw ore such as treatment with sulfuric acid, the objection having to do with the consumption of acid due to the dissolution of iron therein in addition to the other objections pertaining to slow reaction rates and/or incomplete nickel recovery, the metal value containing acid solution, after separation of solids, is subjected to a temperature in excess of 200° C. under appropriate pressure to cause hydrolysis of ferric sulfate to ferric oxide according to the equation:

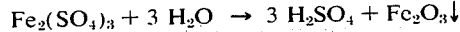

$$Fe_2(SO_4)_3 + 3 H_2O \rightarrow 3 H_2SO_4 + Fe_2O_3\downarrow$$

thus removing iron from the system and generating back the sulfuric acid.

Examples of treatment of the solution containing the desired metal value will include precipitation as the metal, the oxide, the carbonate, or the sulfide or by cementation, neutralization or by solvent extraction and electrolysis thereby further concentrating the metal value such as the nickel value to facilitate recovery in a greater yield than would otherwise be effected. It is also contemplated within the scope of this invention that after treatment of the metal bearing source such as the ore at a temperature in the range of from about 550° to about 900° C. that it is possible to recover the roasted and cooled particles in air, the passivated roasted ore being responsive to an acid leaching. This is in contradistinction to roasted and cooled ores which have been collected in air which are less responsive to ammoniacal leaching if they have been passivated prior to leaching. In addition to the conditions for leaching or extraction which have been hereinbefore set forth, it is also possible to effect the leaching in the presence of oxygen which may be charged to the leaching operation. As will hereinafter be shown in greater detail in the accompanying examples, it is possible to obtain desired metal values from a metal bearing source utilizing an acid leaching solution after treatment of the metal bearing source by roasting at a high temperature in the range of from about 550° to about 900° C. and in contact with at least one additive to obtain yields of the desired metal value which are similar to, or in some cases higher than, that which is obtained when using an ammoniacal leach.

The following examples are presented to illustrate the novelty and utility of the present invention, however, these examples are not intended to unduly limit the scope of this invention in strict accordance therewith.

EXAMPLE I

A series of experimental runs was made utilizing ore compositions which, besides the nickel, contain a low iron and high magnesia content in one instance and a high iron and low magnesia content in the other instance. In each run 25 grams of the ore were weighed into a tared quartz combustion tube, purged with reducing gas to remove any oxygen which may have been contained in the tube and then placed in a split tube furnace at a temperature of about 815° C. A reducing gas was passed over a sample while the temperature was maintained for a period of 30 minutes. The gas composition was as follows:

| GAS | CFM |
|---|---|
| CO | .0125 |
| $H_2$ | .0125 |
| $N_2$ | .050 |
| $CO_2$ | .025 |
| $H_2O$ | 3.5 grams |

When an additive was used, the ore was reduced in the presence of 1% sulfur. After the period of 30 minutes, the gas mixture was replaced by a flow of only carbon dioxide diluted with nitrogen and the tube was cooled to room temperature. The reduced ore samples were mixed with 200 cc. of a leaching solution with a slight oxygen pressure and vigorous agitation in a 2-liter round bottom flask for a period of 2 hours. The resulting solutions were separated by filtration and the filtrate was assayed for nickel content to determine the percent extraction of the nickel value. The results of these tests are set forth in the tables below. In Table I the composition of the ore which was subjected to treatment contained 1.90% nickel, 8.1% iron and 23.3% magnesium oxide. The ore was roasted at 815° C. for a period of 30 minutes in contact with a 1% sulfur additive.

TABLE I

| Acid Leach | Percent Nickel Extracted |
|---|---|
| 1% HCl | 86.1 |
| 4% HCl | 91.6 |
| 10% HCl | 92.2 |
| 1% $H_2SO_4$ | 85.6 |
| 4% $H_2SO_4$ | 90.7 |
| 10% $H_2SO_4$ | 92.3 |
| Ammoniacal Leach | 89.0 |

In the next experiment an ore whose composition included 1.68% nickel, 38% iron and 4.2% magnesium oxide was treated in a manner similar to that set forth in the above paragraphs. The results of the acid leach as compared to the ammoniacal leach was set forth in Table II below:

TABLE II

| Acid Leach | Percent Nickel Extracted |
|---|---|
| 4% HCl | 87.5 |
| 10% HCl | 94.7 |
| 4% $H_2SO_4$ | 89.0 |
| 10% $H_2SO_4$ | 89.9 |
| Ammoniacal Leach | 90.5 |

It is thus apparent that when extracting an ore which is garnieritic, it is possible to obtain a greater yield of the desired nickel values when extracting the ore with acid than is obtained when extracting the ore with an ammoniacal leach solution. Likewise, it is possible, by utilizing a 10% hydrochloric acid solution as the leach material, to obtain a higher yield of nickel than can be obtained when using an ammoniacal leach when the ore contains a high percentage of iron with a relatively low percentage of magnesium oxide.

EXAMPLE II

Another series of experiments were performed to illustrate the ability of an acid leach to remove desirable metal values from a slurry in which the roasted ore has been passivated by exposure to air at temperatures of less than 275° C. for a period of 30 minutes after having been roasted at a temperature of 815° C. for a period of 30 minutes in contact with an additive comprising 1% sulfur. The two ores which were described in Example I above were extracted in an ammoniacal solution and in an acid solution containing 4% by weight of hydrochloric acid. The extraction in one instance was accomplished by slurrying the passivated ore with 200 cc. of an ammoniacal ammonium carbonate solution containing from about 2% to about 25% ammonium, said slurry being agitated vigorously at ambient temperature for a period of 2.5 hours followed by filtration and assaying the filtrate for nickel content. Likewise, the acid leach was accomplished by agitating the passivated ore with 200 cc. of a 4% hydrochloric acid solution for a period of 2 hours at ambient temperature followed by filtration and assaying of the filtrate. The ammoniacal leach of the ore which was high in magnesium oxide content resulted in the extraction of 29.4% nickel. In contradistinction to this when the ore which was rich in magnesium oxide was leached in an acid solution, the nickel recovery amounted to 90.4%.

When the ore which was high in iron content was subjected to an ammoniacal leach after passivation, the nickel recovery amounted to only 8.4%. This contrasted to an 87.1% nickel recovery when the passivated iron rich ore was leached with a 4% hydrochloric acid solution.

EXAMPLE III

In this example the two ores were subjected to an acid leach without being first subjected to a reducing step at an elevated temperature. The raw ore which contained 1.90% nickel, 8.1% iron and 23.3% magnesium oxide was extracted in a manner similar to that set forth in the above examples using hydrochloric acid and sulfuric acid as the leach solution. The results of this extraction are set forth in Table III below:

TABLE III

| Acid Leach | Percent Nickel Extracted |
|---|---|
| 4% HCl | 8.7 |
| 10% HCl | 37.3 |
| 1% $H_2SO_4$ | 13.3 |
| 4% $H_2SO_4$ | 22.7 |
| 10% $H_2SO_4$ | 30.0 |

When the raw ore which contained 1.68% nickel, 38% iron and 4.2% magnesium oxide was extracted with a 4% hydrochloric acid solution, only 11.0% nickel was extracted.

It is therefore readily apparent from a comparison of these values with the values set forth in Example I above that the roasting of the ore in contact with an additive will result in recovery of nickel values up to three times greater than that which is obtained when extracting raw ore without a reducing pretreatment.

EXAMPLE IV

In this example a comparison was made when extracting ore which had been pretreated by roasting in a reducing atmosphere at an elevated temperature of about 815° C. in the presence of additives between the use of a slight oxygen pressure and a slight air pressure. The leaching operation was effected in an open beaker while passing oxygen or air through the agitated acid solution containing the pretreated ore. When oxygen in an amount in excess of requirements was used, the ore which was high in magnesium oxide content had 91.6% of the nickel extracted. When air was bubbled through the mixture in place of oxygen, the nickel recovery amounted to 89.7%.

Likewise, when the ore which was high in iron content and relatively low in magnesium oxide content was extracted in a similar manner, the results showed that 87.5% of the nickel was extracted when oxygen was pressed through the solution as compared to a nickel recovery of 70.8% using air.

EXAMPLE V

Similar results to those set forth in the above examples will be obtained when a nickel bearing ore containing a high magnesium oxide content is roasted at temperatures ranging from about 550° to about 900° C. in a reducing atmosphere and in contact with gaseous sulfur, hydrogen chloride or a mixture of gaseous sulfur and hydrogen chloride and thereafter extracting the nickel with an acid by treating the roasted ore with a solution containing from 1 to 10% by weight of hydrochloric acid or sulfuric acid, that is, the amount of nickel which is extracted from the ore will range from about 85 to about 95%.

When utilizing sulfuric acid for the leach, the slurry after leaching is subjected to a liquid-solid separation, the solids are separated by filtration or settling and the supernatant liquid is passed to an autoclave. The autoclave is heated to a temperature of 225° C. and pressured to 260 pounds per square inch gauge with air. The autoclave and contents thereof are maintained at this temperature for a period of 30 minutes following which the autoclave and contents thereof are allowed to cool to room temperature. The excess pressure is discharged, the autoclave is opened and the hydrolytically precipitated ferric oxide is separated from the regenerated value enhanced sulfuric acid solution.

We claim as our invention:

1. A method for the recovery of nickel from a lateritic nickel ore which comprises treating said ore at a temperature of from about 550° to about 900° C. in a reducing atmosphere and in contact with at least one additive selected from the group consisting of hydrogen halide in a concentration of from about 0.001 to about 2% by weight of the ore and sulfur in a concentration of from about 0.1 to about 5% by weight of the ore, cooling the thus treated ore, extracting the cooled ore with an acidic solution containing from about 1 to about 10% of an inorganic acid selected from the group consisting of hydrochloric, hydrobromic, nitric, phosphoric and sulfuric acids, and recovering the extracted nickel from the solution.

2. The method as set forth in claim 1 in which said acid is hydrochloric acid.

3. The method as set forth in claim 1 in which said acid is sulfuric acid.

4. The method as set forth in claim 1 in which said additive is gaseous sulfur.

5. The method as set forth in claim 1 in which said additive is elemental sulfur.

6. The method as set forth in claim 1 in which said additive is hydrogen chloride.

7. The method as set forth in claim 1 in which said additive is a mixture of gaseous sulfur and hydrogen chloride.

8. The method as set forth in claim 1 in which said extraction is effected in the presence of an oxygen-containing gas.

9. The method as set forth in claim 8 in which said oxygen-containing gas is oxygen.

10. The method as set forth in claim 8 in which said oxygen-containing gas is air.

* * * * *